United States Patent [19]

Yogo

[11] Patent Number: 4,945,747
[45] Date of Patent: Aug. 7, 1990

[54] APPARATUS FOR BENDING ELONGATED MATERIALS IN ANY DIRECTION

[75] Inventor: Teruaki Yogo, Aichi, Japan

[73] Assignee: Chuo Electric Manufacturing Co., Ltd., Japan

[21] Appl. No.: 375,381

[22] Filed: Jul. 3, 1989

[30] Foreign Application Priority Data

May 11, 1989 [JP] Japan .................................. 1-117815
May 11, 1989 [JP] Japan .................................. 1-117816

[51] Int. Cl.$^5$ ............................................. B21D 7/024
[52] U.S. Cl. ........................................ 72/306; 72/321; 72/217; 72/447
[58] Field of Search .......... 72/306, 323, 321, 216–219, 72/388, 149, 159, 446–448, 7; 901/41

[56] References Cited

U.S. PATENT DOCUMENTS

| | | | |
|---|---|---|---|
| 3,262,593 | 7/1966 | Hainer | 414/751 |
| 3,431,759 | 3/1969 | Kidera | 72/7 |
| 3,685,334 | 8/1972 | Sindelar | 72/311 |
| 4,604,885 | 8/1986 | Lang | 72/306 |
| 4,662,204 | 5/1987 | Saegusa | 72/306 |
| 4,735,075 | 4/1988 | Saegusa | 72/306 |

FOREIGN PATENT DOCUMENTS

| | | | |
|---|---|---|---|
| 3620151 | 2/1987 | Fed. Rep. of Germany | 72/306 |
| 1435033 | 5/1976 | United Kingdom | 72/306 |

*Primary Examiner*—Daniel C. Crane
*Attorney, Agent, or Firm*—Oliff & Berridge

[57] ABSTRACT

An apparatus for bending an elongated material in any direction includes a chucking unit, an arm robot having at least three swiveling arm segments, a bending head provided on a free end of the arm segment and a moving device for moving the robot along a line parallel to the chucked material. The bending head is moved by the arm robot perpendicularly toward and away from the material. This facilitates the changing of the bending die to one having a different bending radius to execute bending using various radii. Moreover, since the chucking unit includes an avoiding mechanism for avoiding interference with the arm robot, bending near the center part of the material is also possible.

5 Claims, 7 Drawing Sheets

APPARATUS FOR BENDING ELONGATED MATERIALS IN ANY DIRECTION

BACKGROUND OF THE INVENTION

This invention relates to an apparatus for bending elongated materials, such as pipes and bars, in optional directions, characterized by inclusion of a bending head that moves about the material to define the bending direction.

For bending more than one portion of an elongated material in various directions, conventional apparatus have used a bending head that rotates about the material. Bending apparatus of this kind, for example, have been disclosed in U.S. Pat. No. 4,604,885 and U.S. Pat. No. 4,735,075. These conventional apparatus have a fixed chucking unit for chucking the material and feature a bending head that moves along the longitudinal axis of the material from one end portion to the chucking portion of the material. While moving along the material-axis, the bending head, stops at predetermined bending portions, and rotates about the material-axis to define the bending direction, thus bending the material in the defined direction.

On the other hand, if the material is to be bent using different bending radii at different bending portions, it is necessary to change the bending die of the bending head for each bending portion. The conventional bending apparatus, however, do not have a mechanism for moving the bending die closer to and farther away from the material. It is, therefore, impossible to exchange the bending die to allow different bending radii.

This prior art has another problem in that the material to be bent is near the chucking unit. Since the chucking unit obstructs the movement of the rotating mechanism for rotating the bending head, the bending head cannot be located near the chucking unit. Accordingly, bending is not possible near the chucking unit.

SUMMARY OF THE INVENTION

One object of the present invention is to provide a bending apparatus in which a bending head is movable perpendicular to a material to be closer to and farther away from the material.

Another object of the present invention is to provide a bending apparatus in which bending radii can be optionally changed.

A further object of the present invention is to provide a bending apparatus for bending chucked material in which a chucking unit and a bending head do not interfere with each other.

To achieve these objects, the present invention has an apparatus for bending an elongated material in any direction comprising: a chucking unit for chucking the material; an arm robot having at least three swiveling arm segments connected by swiveling joints, the robot being provided at a side of the chucked material where the free end of the top one of the arm segments can reach the chucked material, and the axis of each swiveling joint is parallel to the longitudinal axis of chucked material; a bending head provided on the free end having a bending die and a pressure die that is movable around the bending die; and a moving device for moving the arm robot along a line parallel to the longitudinal axis of the chucked material.

Since the bending head can be moved closer to and away from the material by the arm robot, it is easy to exchange the bending die in response to the bending radii. Moreover, since the bending die of the bending head is provided with concentric grooves, it is also possible to execute bending in different radii without exchanging the bending die. Furthermore, an avoiding mechanism is installed in the chucking unit so that bending can be accomplished near the center part of the material.

DETAILED DESCRIPTION OF THE INVENTION

Figure 1:
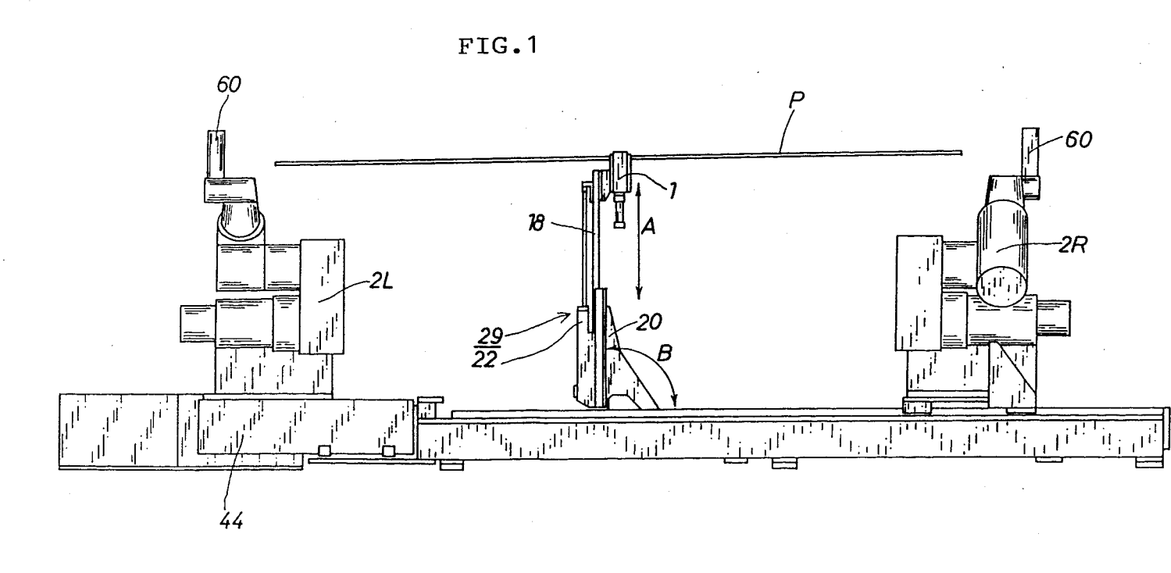
FIG. 1 is a front view showing a bending apparatus in one embodiment of the present invention.

As shown in FIG. 1, a bending apparatus of the present embodiment includes a chucking unit 1 for chucking an elongated pipe P located at the center part of the apparatus, and arm robots 2R and 2L installed on both sides of the chucking unit 1.

Figures 2, 3:
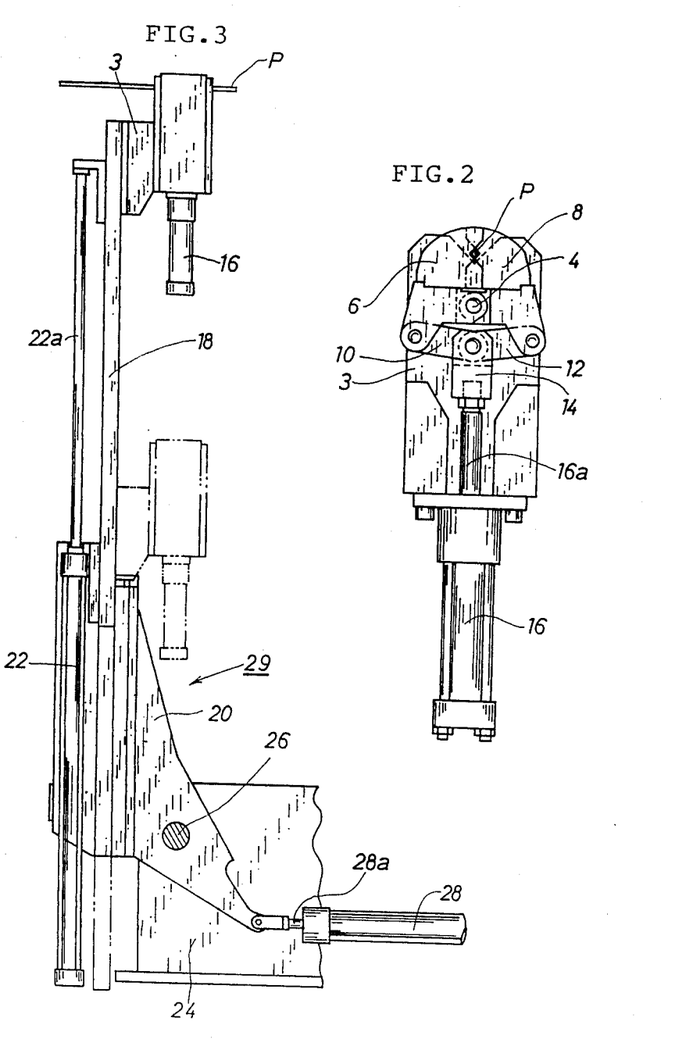
FIG. 2 is an enlarged front view showing a chucking unit of the first embodiment.
FIG. 3 is an enlarged side view of an avoiding mechanism of the first embodiment.

The chucking unit 1 includes, as shown in FIG. 2, a pair of chucking claws 6 and 8, which are connected to a pin 4 projecting from a frame 3 so as to pivot about the pin 4. The lower ends of the chucking claws 6 and 8 are respectively connected by pins to one end of linking members 10 and 12, and the other end of the linking members 10 and 12 are connected by a pin to a joint member 14. The joint member 14 is screwed onto a rod 16a on a cylinder 16 that is attached to the frame 3. When the cylinder 16 pushes up the rod 16a, the chucking claws 6 and 8 pivot about the pin 4 by means of the joint 14 and the linking members 10 and 12, and both ends of the chucking claws 6 and 8 come together to chuck the surface of the pipe P.

As shown in FIG. 3, a frame 3 is fixed at one end of a sliding device 18. The sliding device 18 is slidably supported by a pivoting device 20. The pivoting device 20 includes a vertical cylinder 22 for a rod 22a sliding up and down. The end portion of the rod 22a is fixed to the sliding device 18. The pivoting device 20 is held on a base 24 by means of a pin 26 around which the pivoting device 20 pivots. Moreover, a rod 28a of a transverse cylinder 28 is engaged with one end of the pivoting device 20. The chucking unit 1 is moved in the vertical direction (indicated by an arrow A in FIG. 1) by the vertical cylinder 22, and is pivoted about the pin 26 (as indicated by an arrow B in FIG. 1) by the transverse cylinder 28. The sliding device 18, the pivoting device 20, the vertical cylinder 22, and the transverse cylinder 28 constitute an avoiding mechanism 29 for withdrawing the chucking unit 1 from the chucked pipe P.

Figure 4:
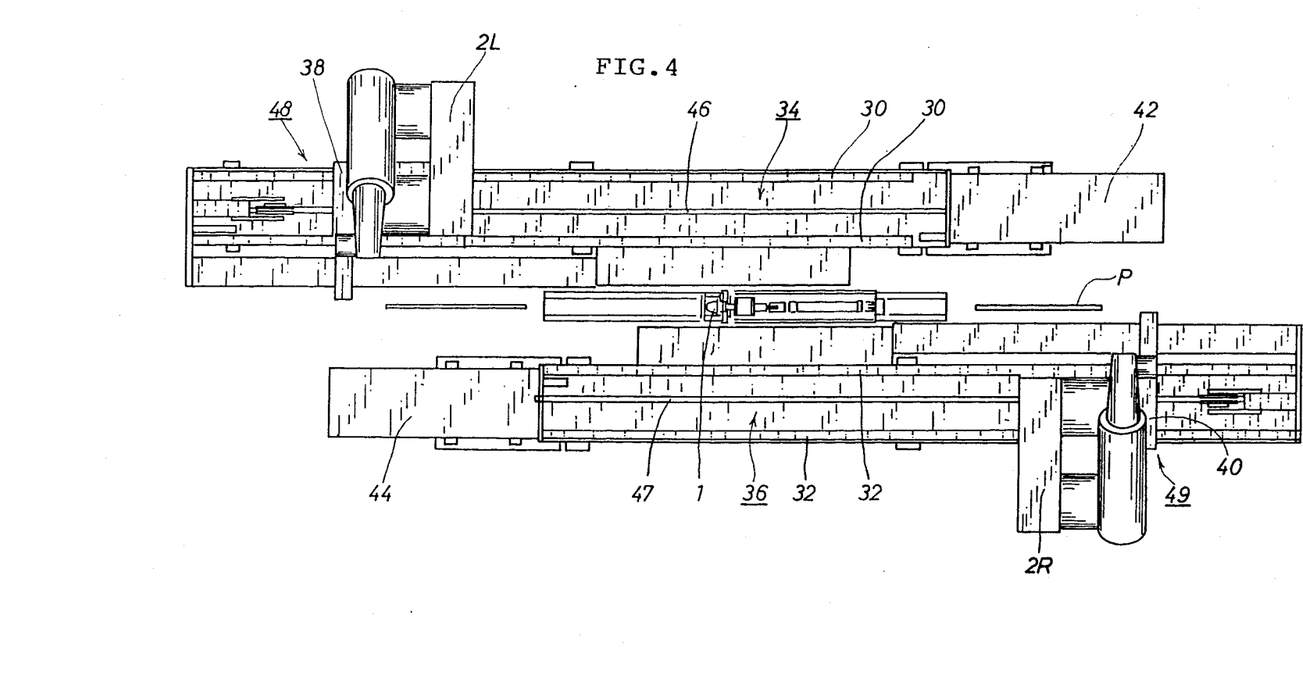
FIG. 4 is a plan view of the bending apparatus of the first embodiment.

As shown in FIG. 4, the chucking unit 1 is located between guideways 34 and 36, which are laid parallel to the pipe P. The guideways 34 and 36 respectively consist of a pair of rails 30 and 32, on each of which moving devices 38 and 40 are provided. These moving devices 38 and 40 are respectively moved along the guideways 34 and 36 by means of chains 46 and 47, which are driven by driving mechanisms 42 and 44, which are installed at one end of each of the guideways 34 and 36. These two moving devices 38 and 40, the guideways 34 and 36, and the driving mechanisms 43 and 44 compose a pair of moving mechanisms 48 and 49.

Figure 5:
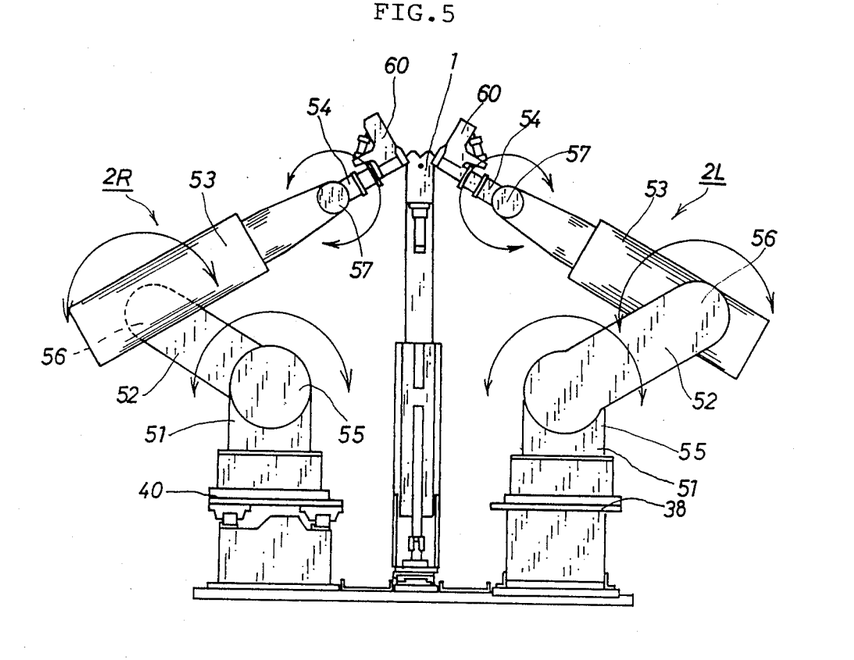
FIG. 5 is a side view of the bending apparatus showing details of arm robots used in the first embodiment.

As shown in FIG. 5, arm robots 2R and 2L are respectively located on the moving devices 38 and 40.

The arm robots 2R and 2L are equipped with a basic portion 51, a first arm segment 52, a second arm segment 53 and an end arm segment 54. The basic portion 51 and the first arm segment 52, the first arm segment 52 and the second arm segment 53, and the second arm segment 53 and the end arm segment 54 are respectively connected via a first joint 55, a second joint 56, and a third joint 57. The first joint 55 includes a known mechanism for rotating the first arm segment 52 about an axis parallel to the axis of the pipe P by a predetermined angle. The second joint 56 and the third joint 57 include the same mechanism as the first joint 55 for rotating the second and the third arm segments 53 and 54 by predetermined angles.

Moreover, each of the arm robots 2R and 2L is equipped with a bending head 60 at the tip of the end arm segment 54. The bending head 60 is constrained to move in a plane perpendicular to the longitudinal axis of the pipe P by means of the joints 55, 56, and 57 and the arm segments 52, 53, and 54, and is positioned at a predetermined location.

Figure 6:
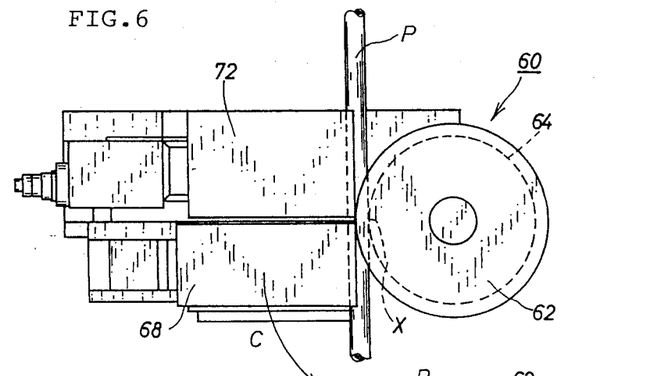
FIG. 6 is a top view of a bending head of the first embodiment.
Figure 7:
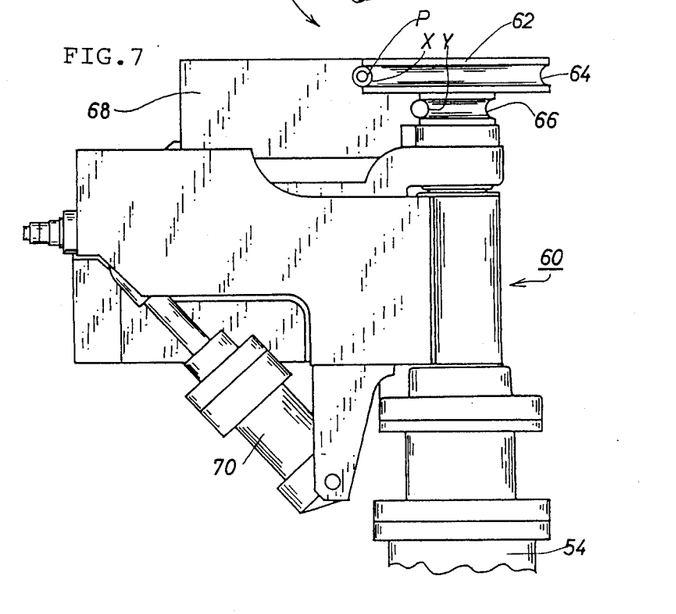
FIG. 7 is a side view of the bending head of the first embodiment.

As shown in FIGS. 6 and 7, the bending head 60 is equipped with bending die 62 provided on an axis extending from the end arm segment 54. Two ring-grooves 64 and 66, corresponding to two different bending radii, are formed in parallel around the axis of the bending head 62. A pressure die 68 is provided opposite to the bending die 62.

The pressure die 68 is driven by a cylinder 70 to move toward the bending die 62 and to grip the pipe P with the bending die 62. While gripping the pipe P, the pressure die 68 is swiveled around the bending die 62. By rotating the pressure die 68 a predetermined angle, a well-known method of compression bending is executed. Moreover, a prop 72 is provided beside the pressure die 68 for bracing against any reaction force occurring during bending.

By driving the cylinder 16, the chucking unit 1 is actuated to grip near the center part of the pipe P. Then, the moving devices 38 and 40 are driven to predetermined positions by actuating the driving mechanisms 42 and 44. Since the moving devices 38 and 40 are moved independently of each other, they can be positioned at optional portions, symmetrically or asymmetrically, in response to the bending form.

Subsequently, individual joints 55, 56, and 57 of the arm robots 2R and 2L rotate according to preset conditions so that a bending position X on the groove 64, which indicates the position for starting the bend, touches the pipe P with the radius of the bending die 62 through position X pointing in the bending direction BD. For bending in a small radius, the joints 55, 56, and 57 move so that the bending starting position Y of the other groove 66 reaches the pipe P.

Figures 8A, 8B, 8C, 8D:
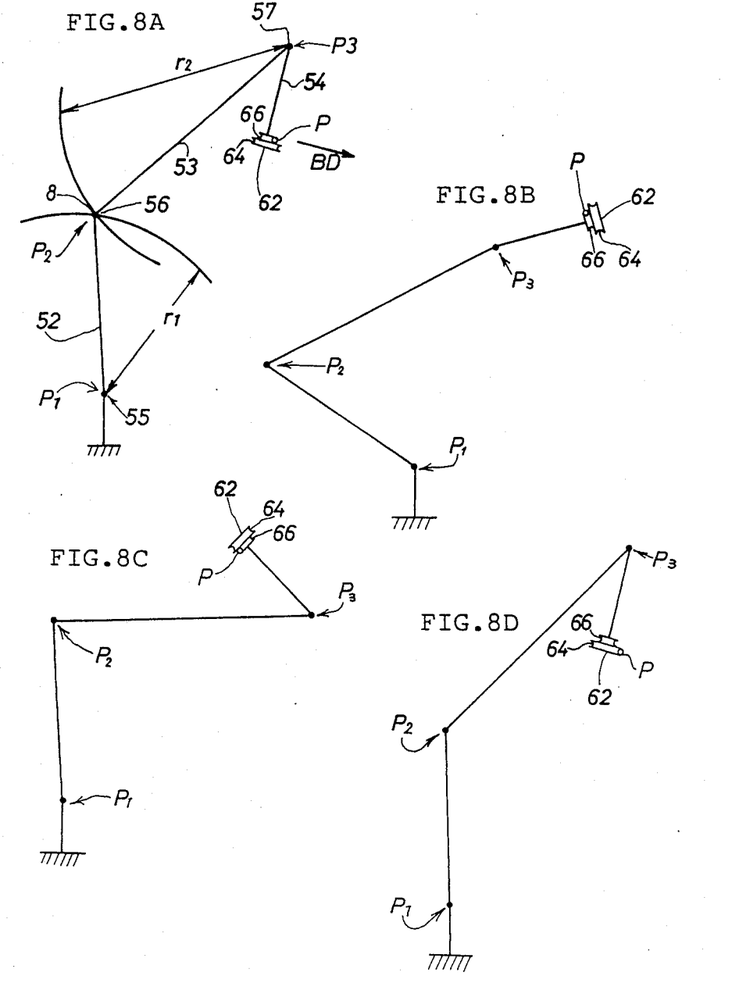
FIGS. 8A, 8B, 8C, and 8D illustrate the movement of the arm robot of the first embodiment.

FIGS. 8A, 8B, and 8C illustrate one case of bending the material using a small radius corresponding to the groove 66 of the bending die 62. The groove 66 is oriented perpendicularly to the end arm segment 54. Accordingly, the end arm segment 54 is located perpendicular to a bending direction BD. Thus, a position P3 of the third joint 57 is determined. A position P2 of the second joint 56 is located at the intersection point of a circle having a radius r1, whose center is defined by a position P1 of the first joint 55, and a circle having a radius r2, whose center is a position P3 of the third joint 57. Once the bending direction is determined, therefore, the position P1, P2, and P3 of the individual joints can be easily obtained. If there are two intersection points for the two circles, the one for which the second arm segment 53 will not interfere with the pipe P should be selected.

By determining the positions of the joints 55, 56, and 57, the angles defined by the basic portion 51 and the first arm segment 52, the first arm segment 52 and the second arm segment 53, and the second arm segment 53 and the end arm segment 54 are obtained. In actual operation, the arm segments 52, 53, and 54 are moved by the joints 55, 56, and 57 according to those obtained angles. Thus, the groove 66 of the bending die 62 is moved to reach the pipe P.

On the other hand, if the pipe P is to be bent using a large radius, the arm segment is moved so that the other groove 64 of the bending die 62 reaches the pipe P, as shown in FIG. 8D.

As described in the above, two types of grooves, one groove 64 for large-radius bending and another groove 66 for small-radius bending, are used in the present embodiment. It should be understood that more complicated bendings are can be made made possible by providing as many grooves as there are the bending radius.

Subsequently, the pressure die 68 of the bending head 60 is moved to grip the pipe P with the bending die 62. With the pipe P attached to the prop 72, the pressure die 68 is swiveled about the bending die 62 by a predetermined angle, as shown by an arrow C in FIG. 6. Thus, the pipe P is bent. After bending the pipe P, the pressure die 68 and the prop 72 are moved to release the pipe P. Since the arm robots 2R and 2L and the individual bending heads 60 are independently movable, each of the bending heads 60 can be set for different angles, directions, and radii for bending. Moreover, it is also possible to bend simultaneously at both bending heads 60.

When the bending process at one portion is finished the driving mechanisms 42 and 44 are actuated again to move the moving devices 38 and 40 toward the chucking unit 1 to the next bending position. When they reach the scheduled bending position, the bending heads 60 are moved according to the predetermined bending direction and radius by driving the arm robots 2R and 2L, in the same manner as described above. Thus, the pipe P is bent by the bending heads 60 according to the predetermined bending angle, direction, and radius.

By repeating these operations, bending is successively done from the both ends of the pipe P toward the chucking unit 1. When bending is done to a portion near the chucking unit 1, if the arm robots 2R and 2L might interfere with the chucking unit 1, the sliding device 18 or the pivoting device 20, or if the end of the bent pipe P might interfere with the chucking unit 1, the chucking unit 1 is withdrawn to avoid the interference.

The withdrawal of the chucking unit 1 is done as follows. First, the pipe P is put between the bending heads 60 to be held by them. Subsequently, the cylinder 16 is actuated to release the chucking craws 6 and 8 for chucking the pipe P. Then, the longitudinal cylinder 22 is actuated to lower the sliding device 18 to the lower end position shown by a two-dash line in FIG. 3. Since the pipe P is supported by the bending dies 62, the pressure dies 68 and the props 72 of the individual bending heads 60, it will not fall when the chucking unit 1 is released.

Subsequently, the transverse cylinder 28 is actuated to pivot the pivoting device 20 as shown by the arrow B in FIG. 1, thereby storing the chucking unit 1 in the base 24. The withdrawal by the avoiding mechanism 29 of the chucking unit 1 from its position n the axis of the pipe P prevents interference that might occur between the chucking unit 1, sliding device 18, or the pivoting device 20 and the moving devices 38 and 40 of the arm robots 2R and 2L, the basic portion 51, arm segments 52, 53 and 54, or the joints 55, 56, and 57. Moreover, it can also prevent interference between the end of the pipe P and the chucking unit 1, the sliding device 18, or the pivoting device 20, which might occur after the pipe P is bent.

Bending within the interference region can be realized as follows. While the pipe P chucked and supported only by the bending head 60 of the arm robot 2R, the pipe P is bent by the bending head 60 of the other arm robot 2L. Then, the pipe P undergoes another bending by the bending head 60 of the arm robot 2R. If the pipe P is to undergo further bending, for example, the pipe P is chucked and supported only by the bending head 60 of the arm robot 2R and the location of the arm robot 2R remains fixed. Then, the moving device 38 is moved by the driving mechanism 42 to a predetermined bending portion so that the pipe P is bent by the bending head 60 of the other arm robot 2L. Thus, bending can be accomplished even in the region where the chucking unit 1 may interfere with the other devices.

Figures 9, 10:
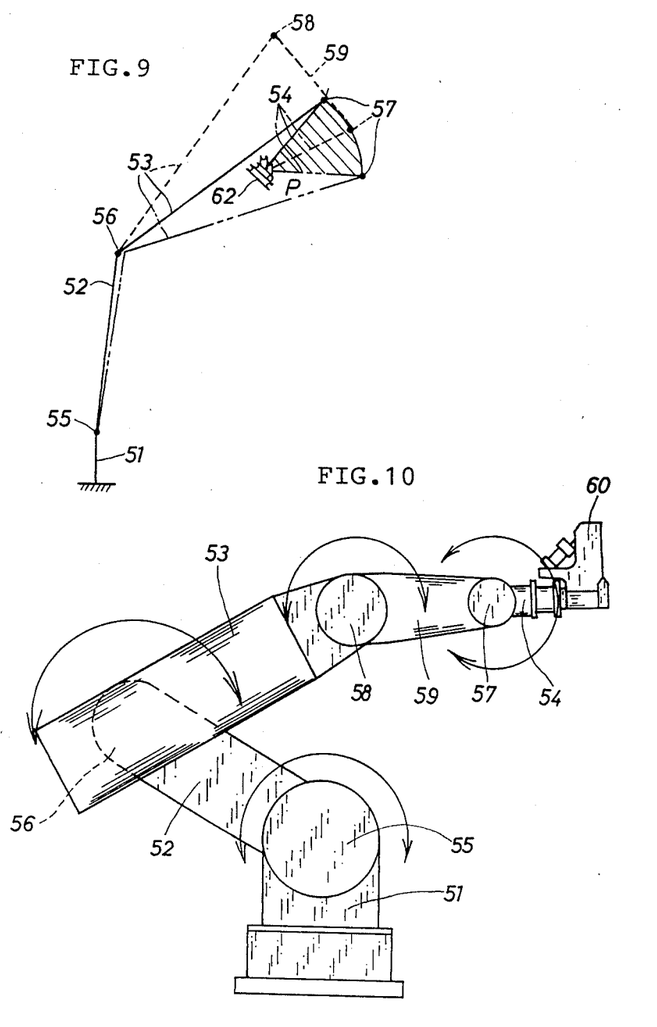
FIG. 9 is an explanatory view for an interference region described in the first embodiment.
FIG. 10 is a front view of an arm robot used in another embodiment.

Though the arm robots 2R and 2L include only three joints 55, 56, and 57 in the present embodiment, it is probable, depending on the dimensional relations among these joints 55, 56, and 57, that interference between the second arm segment 53 and the pipe P may produce a region in which the end arm segment 54 cannot be positioned as shown by a hatched portion in FIG. 9. To cope with this, the arm robots 2R and 2L can be provided with four joints 55, 56, 57, and 58, and a third arm segment 59, as shown in FIG. 10. This structure will avoid the above-mentioned interference region, so that the pipe P can be bent in optional directions without any restriction (see the broken line in FIG. 9). It is possible to increase the number of joints to five or more as the situation demands.

As described above, in the present embodiment, the bending heads 60 installed in the end portions of the arm robots 2R and 2L are moved by at least three of the joints 55, 56, 57, and 58 in a plane perpendicular to the axis of the pipe P. It is, therefore, possible to execute bending using various radii by providing a bending die 62 having more than one groove 64 and 66. Moreover, since the bending apparatus of the present embodiment has avoiding mechanism 29, the chucking unit 1 will never interfere with the arm robots 2R and 2L. It is, therefore, possible to bend near the center part of the pipe P.

While the invention has been described with reference to a preferred embodiment, it should be understood by those skilled in the art that various other modifications may be made without departing from the spirit and scope of the invention.

I claim:

1. An apparatus for bending an elongated material in any direction comprising:
   a chucking unit including a gripper for chucking elongated material, said grippers having gripping surfaces for gripping said material so as to extend within said grippers along a longitudinal axis;
   an arm robot having at least four swiveling arm segments connected by four swiveling joints, the robot being provided at a side of the chucked material where a free end of a top one of the arm segments can reach elongated material held by said chucking unit, an axis of said four swiveling joint being parallel to said longitudinal axis of the gripper;
   a bending head provided on the free end having a bending die and a pressure die that is movable around the bending die; and
   a moving device for moving the arm robot along a line parallel to the longitudinal axis of the gripper an avoiding mechanism for avoiding interference between the chucking unit and the arm robots by withdrawing the chucking unit from the chucked material so that bending of the material by the bending heads can be accomplished in the region where the chucking unit interferes with the robot arms, said avoiding mechanism including a sliding device for supporting the chucking unit and sliding the chucking unit up and down as a whole, and a pivoting device for pivoting the sliding device with the chucking unit.

2. An apparatus for bending an elongated material according to claim 1, wherein the bending die has at least two concentric ring-grooves and the pressure die has grooves opposite the ring-grooves.

3. An apparatus for bending an elongated material in any direction comprising:
   a chucking unit including a gripper for chucking elongated material, said grippers having gripping surfaces for gripping said material so as to extend within said grippers along a longitudinal axis;
   a pair of arm robots each having at least four swiveling arm segments connected by four swiveling joints, one robot being provided on each side of the chucking unit wherein a free end of a top one of the arm segments can reach the chucked material, an axis of said four swiveling joint being parallel to said longitudinal axis of the grippers;
   a pair of bending heads, one bending head being provided on the free end of each top one of the arm segments, each bending head having a bending die and a pressure die that is movable around the bending die; and
   a pair of moving devices for moving the arm robots along lines parallel to the longitudinal axis of the grippers, each line extending along separate and non-coextensive paths with each line being on opposed sides of the grippers an avoiding mechanism for avoiding interference between the chucking unit and the arm robots by withdrawing the chucking unit from the chucked material so that bending of the material by the bending heads can be accomplished in the region where the chucking unit interferes with the robot arms, said avoiding mechanism including a sliding device for supporting the chucking unit and sliding the chucking unit up and down as a whole, and a pivoting device for pivoting the sliding device with the chucking unit.

4. An apparatus for bending an elongated material according to claim 3, wherein the bending dies each have at least two concentric ring-grooves, and the pressure dies have grooves opposite the ring-grooves.

5. An apparatus for bending an elongated material in any direction comprising:

a chucking unit including a gripper for chucking elongated material, said grippers having gripping surfaces for gripping said material so as to extend within said grippers along a longitudinal axis;

a pair of robot arms each having at least three swiveling arm segments connected by swiveling joints, one robot arm being provided on each side of the chucking unit wherein a free end of a top one of the arm segments can reach the chucked material, an axis of each swiveling joint being parallel to said longitudinal axis of the grippers;

a pair of bending heads, one bending head being provided on the free end of each top one of the arm segments, each bending head having a bending die and a pressure die that is movable around the bending die;

a pair of movable devices for moving the arm robots along lines parallel to the longitudinal axis of the grippers, each line extending along separate and non-coextensive paths with each line being on opposed sides of the grippers; and an avoiding mechanism for avoiding interference between the chucking unit and the arm robots by withdrawing the chucking unit from the chucked material so that bending of the material by the bending heads can be accomplished in the region where the chucking unit interferes with the robot arms, said avoiding mechanism including a sliding device for supporting the chucking unit and sliding the chucking unit up and down as a whole, and a pivoting device for pivoting the sliding device with the chucking unit.

* * * * *